United States Patent [19]

Dedic

[11] Patent Number: 4,972,406
[45] Date of Patent: Nov. 20, 1990

[54] ECHO CANCELLER

[75] Inventor: Ian J. Dedic, Northolt, England

[73] Assignee: The General Electric Company, p.l.c., England

[21] Appl. No.: 222,787

[22] Filed: Jul. 22, 1988

[30] Foreign Application Priority Data

Aug. 14, 1987 [GB] United Kingdom ................. 8719307

[51] Int. Cl.$^5$ .............................................. H04B 3/20
[52] U.S. Cl. ................... 370/32.1; 379/410
[58] Field of Search ................ 370/32.1, 32; 379/410, 379/411, 406; 364/724.16, 724.19; 341/172

[56] References Cited

U.S. PATENT DOCUMENTS

| | | | |
|---|---|---|---|
| 4,570,036 | 2/1986 | Virdee | 370/32.11 |
| 4,605,826 | 8/1986 | Kanemasa | 370/32.1 |
| 4,791,405 | 12/1988 | Rybicki et al. | 341/172 |

FOREIGN PATENT DOCUMENTS

| | | |
|---|---|---|
| 0048515 | 3/1982 | European Pat. Off. . |
| 0122594 | 10/1984 | European Pat. Off. . |
| 0159142 | 10/1985 | European Pat. Off. . |
| 0163298 | 12/1985 | European Pat. Off. . |
| 0167677 | 1/1986 | European Pat. Off. . |
| 0303363 | 2/1989 | European Pat. Off. . |
| 3515832 | 11/1986 | Fed. Rep. of Germany . |
| 3533867 | 3/1987 | Fed. Rep. of Germany . |
| 2195877 | 3/1974 | France . |
| 2007946 | 5/1979 | United Kingdom . |

OTHER PUBLICATIONS

N7483 4-Bit Binary Full Adder, Signetics Corp., 1973, pp. 2-83, 2-84.
"A New Digital Echo Canceler for Two-Wire Subscriber Lines", by Nils Holte, et al., IEEE Transactions on Communications, vol. Com-29, No. 11, Nov., 1981, pp. 1573-1581.
"A 160-kb/s Digital Subscriber Loop Transceiver with Memory Compensation Echo Canceller", by R.P. Colbeck, IEEE Transactions on Circuits and Systems, vol. CAS-33, No. 2, Feb., 1986, pp. 175-182.
"VLSI Technology for ISDN Products", by Tommy Svensson, Ericsson Review, No. ISDN, 1984, pp. 58-63.
IBM Technical Disclosure Bulletin, "Recirculating PCM Coder/Decoder", by C. A. Jacquart, vol. 14, No. 5, Oct., 1971.
1976 IEEE International Solid State Circuits Conference, vol. 19, No. 19, "An All-MOS Companded PCM Voice Encoder", by John P. Tsividis et al.
8089 IEEE Transactions on Communications, vol. COM-30 (1982), No. 9, New York, "Adaptive Reference Echo Cancellation", by David D. Falconer.
1986 IEEE, "A Long Reach Digital Subscriber Loop Transceiver", by P. F. Adams, et al., Dec., 1986, vol. 1.

Primary Examiner—James L. Dwyer
Attorney, Agent, or Firm—Kirschstein, Ottinger, Israel & Schiffmiller, P.C.

[57] ABSTRACT

An echo canceller (1) for full duplex digital data transmission in a transmitter/receiver unit when connected via a hybrid circuit (2) to one end of a two wire line (3). In order to provide adequate cancellation at a line data rate of 160 kbit/s over 7-8 km, a data bit history of at least 9 bits is used to address a memory having at least 3 partitions (41-44) with the first partition (41) being addressed by a sequence of at least 3 data bits. This partitioning achieves a small memory size, less than 2 kbits, and a small total chip area for integrated circuit realization of the canceller together with a clocking speed for moderate power consumption is maintained by using serial arithmetic (61-63) for adding the partition outputs together with pipelining (D1, D21-D24). An exponentially quantitizing analog-to-digital converter error signal circuit (9), shown in detail in FIG. 2, is used which has wider application to echo cancellers other than the partitioned memory compensation type.

24 Claims, 3 Drawing Sheets

ECHO CANCELLER

BACKGROUND OF THE INVENTION

1. Field of the Invention

This invention relates to an echo canceller for enabling full duplex digital data communication in a transmitter/receiver unit when connected via a hybrid circuit to one end of a two wire line.

More particularly this invention relates to such an echo canceller in which a memory unit is addressed by a sequence of data bits transmitted over a predetermined data interval, in which the memory unit contains a set of digital estimates of the near end echo of the data transmitted over said data interval, each digital estimate of the set corresponding to one of a number of sample periods per data bit period and one of the possible said sequences of data bits, in which once per sample period a said digital estimate is provided from the memory unit and is applied via a digital-to-analogue converter to an analogue summation circuit together with the received signal to suppress said near end echo in the received signal, and in which an error signal circuit derives from the output of the analogue summation circuit an error signal which is applied to the memory unit such that once per sample period an error adjusted digital estimate is written into the memory unit.

2. Description of Related Art

An echo canceller as described above is known from patent specification GB No. 2,007,946 B (see FIGS. 10 and 12). It is also known from the article by N. Holte and S. Stueflotten in IEEE Transactions on Communications, Vol. COM-29, No. 11, November 1981, pages 1573-1580. The Holte article denotes the principle used in this echo canceller as memory compensation in contrast with previously known echo cancellers using a digital transversal filter as a compensation circuit. Thus with memory compensation the data bit sequence is used to address a memory which stores the actual digital echo estimates, in contrast to transversal filter compensation where the signs of the data bit sequence determine addition or subtraction of coefficients stored by the filter so as to synthesise the digital echo estimates.

The Holte article describes an echo canceller which can be effective at a line data rate of 80 kbit/s for a line length of 7 km. The attenuation of the received signal at this frequency on this line length may be up to 30 db. The near end echo of the transmitted signal will be attenuated by the hybrid by at least 10 db. Thus to ensure a satisfactory 20 db signal-to-noise ratio for the received signal, the echo cancellation circuit is required to attenuate the near end echo in the signal received via the hybrid by 40 db. Holte indicates that at this frequency of 80 kbit/s, the echo impulse response of the line which must be covered to provide 40 db attenuation has a duration of 5 data bits, and proposes compensation of 8 samples per data bit period with a 12 bit word for each echo estimate. The size of the read/write RAM digital memory required to hold the echo estimates addressed by 5 data bits is thus $2^5 \times 8 \times 12 = 3$ kbits.

For an integrated services digital network (ISDN) a subscriber transmitter/receiver unit is now required which is capable of operating at a line data rate of 160 kbit/s. An article by R. P. Colbeck and P. B. Gillingham in IEEE Transactions on Circuits and Systems, Vol. CAS-33, No. 2, February 1986, pages 175-182 describes an integrated circuit transmitter/receiver unit with memory compensation echo cancellation capable of operating at 160 kbit/s line rate. This uses 14 bit words in the RAM memory, addressed by a 5 data bit history with 8 samples per baud. The memory size is thus $2^5 \times 8 \times 14 = 3.5$ kbits. This is said to provide 45 db of echo cancellation which, with a hybrid echo attenuation of 10 db and a required signal-to-noise-ratio for the received signal of 15 db, will accommodate a cable attenuation of the received signal of 40 db which covers an 80 kbit/s received signal over a line length of 5 km or a 160 kbit/s received signal over a line length of 4 km. Thus echo cancellation for the full range of subscriber line lengths up to 7 km at the required line data rate of 160 kbit/s is nowhere near achieved by the Colbeck design even for the signal-to-noise ratio of only 15 db. These subscriber transmitter/receiver units are required to be a high volume low cost item with the cost being largely determined by the chip area of the integrated circuit. FIG. 8 of the Colbeck article shows approximately one quarter of the chip area occupied by the memory. We consider that to achieve a desirable signal-to-noise ratio of 20 db for a line length of 7 km at 160 kbit/s line rate it is desirable to have at least a 9 bit data history. With the Colbeck design this would increase the memory area by 16 times and hence the total chip area by approximately 4 times, which is clearly unacceptable.

An article by T. Svensson in Ericsson Review No. ISDN, Vol 61, May 1984, describes an echo canceller for use at 160 kbit/s which is called a dual RAM filter. Thus memory compensation is effected by partitioning the RAM memory into two sections. The memory is addressed by a 7 bit data history with 3 bits being applied to the one partition and 4 bits being applied to the other partition. The outputs of the two RAMs are added before application to a digital-to-analogue converter. It is stated that the advantage of a dual RAM configuration compared with a single RAM configuration is that the total RAM size will be considerably smaller. The bit length of the words in the RAM and the number of samples per data bit period are not stated, but if they were 14 bits and 8 samples as in the above-discussed Colbeck article this would result in a memory size of $(2^3 + 2^4) \times 8 \times 14 = 2688$ bits. The nature of the circuit used for adding the two RAM outputs is not stated. However, assuming that parallel buses are used, as shown by Holte and Colbeck, together with a parallel adder, this circuit for the addition will incur a chip area penalty to partly offset the reduction in memory area achieved by partitioning. Furthermore, as stated above, we consider that at least a 9 bit data history is desirable. With the Svensson design, two RAMs addressed respectively by 4 bits and 5 bits would double the memory size to approximately 5 kbits as well as having the area penalty of the circuit for addition, which is unacceptable. We have considered the possibility of extrapolating the Svensson design by further partitioning the memory to three partitions each addressed by three data bits. This would enable a 9 bit history to be accommodated by the same memory size as the dual partition memory disclosed by Svensson but would greatly increase the area penalty of the circuit for addition and so still be unacceptable.

SUMMARY OF THE INVENTION

One object of the present invention is to provide an improved echo canceller which overcomes the above-described problems involved in provision for operation at up to 160 kbit/s over the full range of subscriber line lengths.

According to a first aspect of the present invention there is provided an echo canceller for enabling full duplex digital data communication in a transmitter/receiver unit when connected via a hybrid circuit to one end of a two-wire line, in which a memory unit has memory partitions each of which is addressed by a sequence of data bits transmitted over part of a predetermined data interval, in which once per sample period there is directly read from each memory partition a digital estimate of the near end echo of the data transmitted over a corresponding part of said data interval, in which in the memory unit said digital estimates read at the same time are added to provide a digital estimate of the full near end echo of the data transmitted over said data interval, in which each said digital full echo estimate is applied via a digital-to-analogue converter to an analogue summation circuit together with the received signal to suppress said near end echo in the received signal, and in which an error signal circuit derives from the output of the analogue summation circuit an error signal which is applied to the memory unit such that once per sample period an error adjusted digital estimate is written into each memory partition, characterised in that there are at least three memory partitions, the one which is addressed by the most recently transmitted data being addressed by a sequence of at least three data bits and said data interval being at least nine data bit periods, in that the addition of digital estimates from the memory partitions is by a serial arithmetic arrangement, each full echo estimate being applied to the analogue summation circuit at an integral number of sample periods after the corresponding digital estimates are read from the memory partitions, in that the near end echo path for the transmitted data includes means which delay the near end echo so that each full echo estimate is applied to the analogue summation circuit together with the near end echo which it is intended to suppress, and in that means are provided in the memory unit to apply each digital estimate read from a memory partition to an error adder provided in respect of that partition such that each error signal is applied to a said error adder together with the digital estimate which it is intended to adjust, each adjusted digital estimate being written into its respective memory partition an integral number of sample periods after it was read therefrom.

In the echo canceller according to the invention as just described, a partitioned memory is used together with serial arithmetic and pipelining. Both these techniques are known per se in fully digital systems. However, we consider that their combined use in the partly digital and partly analogue system of a memory compensation echo canceller in order to realise the full potential of partitioned memory involves an inventive step. The advantage of serial arithmetic for adding the outputs of the memory partitions is to minimise the chip area required for this addition. The disadvantage of serial arithmetic is that it is inherently slower than parallel arithmetic for this purpose. If a sufficiently high clock speed were applied to the serial arithmetic to compensate for this inherent slowness, there would be an unacceptable increase in power consumption. This problem is overcome by the use of pipelining; that is to say that instead of the outputs of the memory partitions being adjusted and written back within a single sample period, analogue summation and writing back each take place after an integral number of sample periods and delays are introduced in order to synchronise the analogue summation of the echo estimate with the echo, to synchronise the error signal with the echo estimates for addition, and to write the adjusted echo estimates back into the correct memory locations.

In the echo canceller according to the invention, partitioning may be advantageously used to the extent of having four memory partitions, in which case only three one-bit adders are needed for adding their outputs. The four memory partitions may each be addressed by three data bits, in which case a 12 bit data history is used which achieves more than adequate echo cancellation at 160 kbit/s over the longest required lines. Four samples per data bit period are considered to be adequate, and each digital estimate should be at least a 12 bit word. If 16 bit words were used then the total memory size would only amount to $2^3 \times 4 \times 4 \times 16 = 2$ k bits.

The means in the near end echo path for the transmitted data which delay the near end echo most conveniently may comprise means which delay the transmission of each data bit via the hybrid circuit by an integral number of sample periods after that data bit is applied to the memory unit for addressing the memory partitions.

The digital estimates read from the memory partitions at the same time may be added by said serial arithmetic arrangement in one sample period, with the resulting digital full echo estimate being converted by said digital-to-analogue converter in the succeeding sample period.

The means provided to apply each digital estimate to an error adder may consist of delay means into which the bits of that digital estimate are input in serial form at the same time as they are put into said serial arithmetic arrangement and from which the bits of that digital estimate are output in serial form delayed by an integral number of sample periods. This very conveniently avoids the need to read the digital estimates again from the partitions in order to present them at the correct time to the error adders.

A serial/parallel register may be provided in respect of each memory partition, a digital estimate which has been read from that memory partition in parallel form being output from that register in serial form to the serial arithmetic arrangement while an adjusted digital estimate which is to be written into that memory partition in parallel form is being input to that register in serial form from the respective error adder. This enables a sequence for reading and writing the digital estimates in parallel form with the associated switching of addresses to be conveniently provided within each sample period.

The error signal circuit may be an analogue-to-digital converter which converts a sampled output of the analogue summation circuit to a digital error signal over an integral number of sample periods. In this case both the digital error signal and each digital estimate which it is intended to adjust may be applied in serial form to the respective error adder.

In both the Holte and Colbeck prior art articles discussed above it has been recognised that fast adjustment of the stored digital echo estimates would be achieved by a stochastic iteration algorithm, that is to say where the error signal would be provided by an analogue-to-digital converter as a positive or negative value proportional to the magnitude of the analogue summation circuit output. However, in both the Holte and Colbeck articles the circuit complexity and chip area required for this adaptation method has been rejected in favour of the slower but simpler sign algorithm, that is to say where a comparator is simply provided to give a positive or negative error signal which increments or decrements the stored digital estimates one step at a time.

For the echo canceller according to the present invention we propose as an optional feature a simple analogue-to-digital converter which can provide an advantageous compromise between fully proportional stochastic adaptation and sign adaptation. Thus in the echo canceller as described in the penultimate paragraph, the digital error signal may be exponentially quantised, this being achieved in that in the analogue-to-digital converter the sampled output of the analogue summation circuit is applied as an input voltage to charge a capacitor arrangement to an initial voltage which is compared with a reference voltage to provide a least significant bit output of the converter, after which in each of successive steps the voltage on the capacitor arrangement is halved and that halved voltage is compared with said reference voltage to provide the next significant bit output of the converter.

In the echo canceller just described, each digital estimate which it is intended to adjust may be applied to the respective error adder in serial form, and the digital error signal may be produced in one sample period, the bits of each digital error signal being applied to the error adders as they are produced in serial form without waiting for that signal to be completed.

More particularly in the echo canceller described in the penultimate paragraph, the analogue-to-digital converter may include a single comparator and a switching arrangement by means of which said input voltage is first applied to the comparator to determine the sign of that input voltage and to provide an output bit of the converter indicative of that sign, said reference voltage and said initial voltage on the capacitor arrangement then being applied in dependence on said determined sign of the input voltage to appropriate inputs of the comparator to provide said least significant and succeeding output bits of the converter, said sign bit and said least significant and succeeding bits being combined to provide the result of analogue-to-digital conversion in a predetermined bipolar code. An analogue-to-digital converter which includes only a single comparator is particularly economical in the chip area required.

A common bipolar code is the two's complement code. If this is used in the echo canceller just described then the chip area required for the error adders may be advantageously minimised with an arrangement in which each error adder is a one-bit adder, in which the digital estimates are applied to the one-bit error adders in two's complement coded serial form, and in which the combination of the error signal least significant and succeeding bits with the error signal sign bit is performed by the one-bit adders to provide the result of analogue-to-digital conversion in two's complement coded form.

The analogue-to-digital converter which has been proposed above to provide a compromise between fully proportional stochastic adaptation and sign adaption, whether or not it has the particular single comparator and switching arrangement described, could be used with advantage in echo cancellers not necessarily limited to the particular partitioned memory compensation echo canceller using serial arithmetic and pipelining according to the first aspect of the invention as described above. Thus it could be used in a memory compensation echo canceller of the above-described Holte or Colbeck type, that is to say in which there is a memory unit which contains a set of digital estimates of the near end echo, each digital estimate of the set corresponding to one of the number of sample periods per data bit period and one of the possible full sequences of data bits over the transmitted data interval employed, and in which the error signal is applied to the memory unit such that once per sample period an error adjusted digital estimate is written into the memory unit. Furthermore, we consider that this analogue-to-digital converter could be used not only in a memory compensation echo canceller but also in a transversal filter echo canceller. In all cases, analogue-to-digital conversion of the error signal speeds up adjustment of the echo canceller which is particularly important at a high line data rate of 160 kbit/s when the transmitter/receiver unit may correspondingly need to occupy the line for only a short period at a time.

Thus according to a second aspect of the present invention there is provided an echo canceller for enabling full duplex digital data communication in a transmitter/receiver unit when connected via a hybrid circuit to one end of a two-wire line, in which a compensation unit is addressed by a sequence of data bits transmitted over a predetermined data interval, in which the compensation unit contains information from which in each of a number of sample periods per data bit period there is provided a digital estimate of the near end echo of the data transmitted over said data interval, in which each said digital estimate is applied via a digital-to-analogue converter to an analogue summation circuit together with the received signal to suppress said near end echo in the received signal, and in which an error signal circuit derives from the output of the analogue summation circuit an error signal which is applied to the compensation unit such that once per sample period the information in the compensation unit is adjusted, characterised in that the error signal circuit is an analogue-to-digital converter which converts a sampled output of the analogue summation circuit to an exponentially quantised digital error signal, and in that in the analogue-to-digital converter the sampled output of the analogue summation circuit is applied as an input voltage to charge a capacitor arrangement to an initial voltage which is compared with a reference voltage to provide a least significant bit output of the converter, after which in each of successive steps the voltage on the capacitor arrangement is halved and that halved voltage is compared with said reference voltage to provide the next significant bit output of the converter.

BRIEF DESCRIPTION OF THE DRAWINGS

The invention will now be described in detail with reference to the accompanying drawings, in which.

DETAILED DESCRIPTION OF THE PREFERRED EMBODIMENTS

Figure 1:
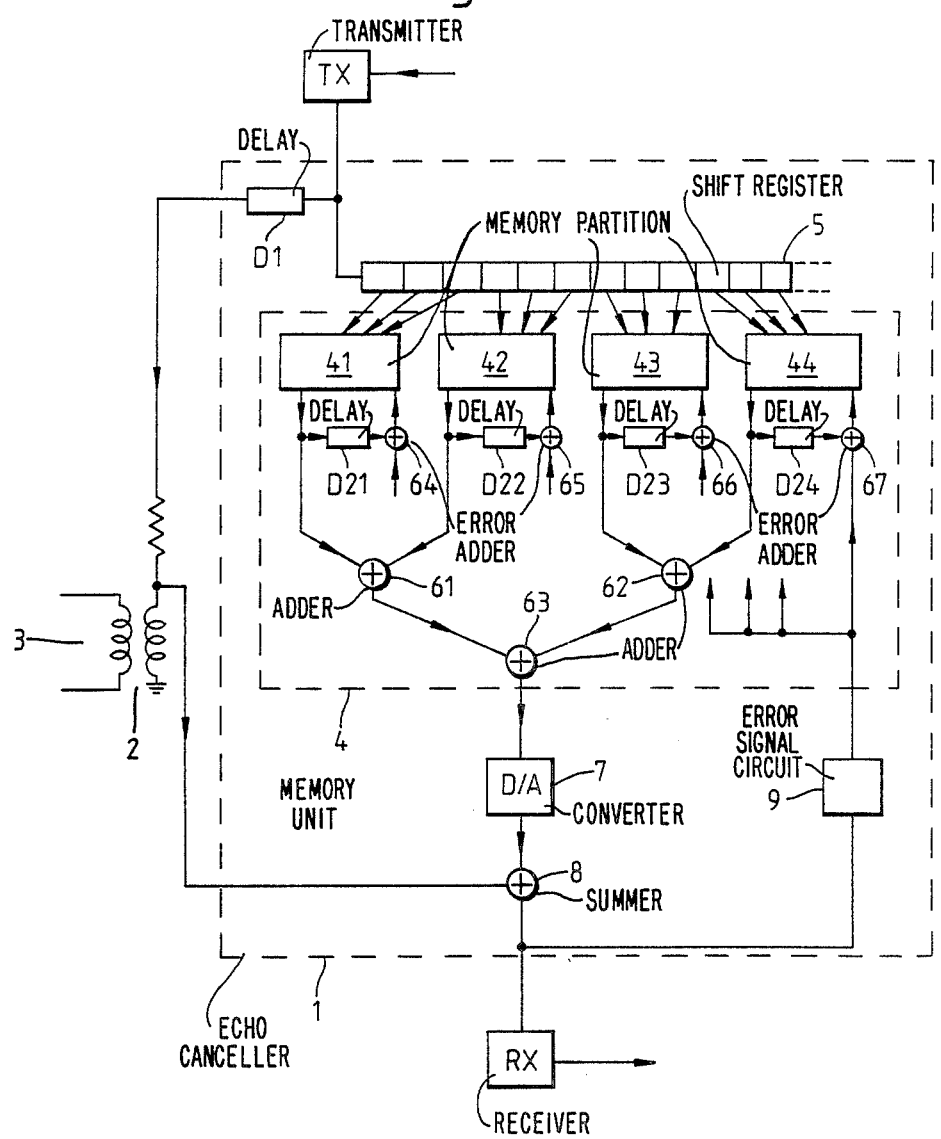
FIG. 1 shows an echo canceller according to the invention included in a transmitter/receiver unit connected via a hybrid circuit to one end of a two-wire line for full duplex digital data communication.

Referring now to FIG. 1, there is shown a subscriber transmitter/receiver unit, suitable for realisation as a single integrated circuit chip, and including a transmitter TX, a receiver RX and an echo canceller 1 for enabling full duplex digital data communication in the unit when connected via a hybrid circuit 2 to one end of a two-wire line 3.

The transmitter/receiver unit is suitable for use in an integrated services digital network (ISDN) and is capable of operating at a line data rate of 160 kbit/s comprising, for example, two 64 kbit/s digitised speech channels, one 16 kbit/s data information channel and 16 kbit/s framing information. A binary line code such as a biphase WAL1 code is used for the transmitted data bits.

The cable attenuation of the signal transmitted at 160 kbit/s over the longest subscriber lines of 7-8 km may be up to 45 db. The signal received by the receiver RX consists essentially of the cable attenuated signal transmitted from the far end of the two-wire line 3 together with the near end echo of the signal transmitted by the transmitter TX which may be attenuated by as little as 10 db by the hybrid circuit 2. Thus for a 20 db signal-to-noise ratio at the receiver RX, the echo canceller 1 is required to attenuate the near end echo by 55 db. The impulse response of these subscriber lines at these frequencies is such that for this degree of echo cancellation the echo canceller should provide an estimate of the near end echo of data transmitted over an interval of at least 9 data bit periods. The echo canceller 1 uses a 12 bit data history which is thus more than adequate for the purpose.

In the echo canceller 1, a memory unit 4 has four memory partitions 41-44 each of which is addressed, via shift register 5, by a sequence of three of the data bits transmitted over a 12 bit data interval, the memory partition 41 being addressed by the three most recently transmitted data bits and so on. The receiver RX samples the received signal four times per data bit period, and once per sample period there is directly read from each of the memory partitions 41-44 a 14 bit word digital estimate of the near end echo of the data transmitted over a corresponding part of a 12 bit data interval. Each memory partition 41-44 thus stores $2^3 \times 4 \times 14 = 448$ bits, and the total memory size of the memory unit 4 is 1792 bits. More than 14 bits per digital echo estimate word could be provided, for example 16 bits. For good accuracy of echo cancellation the digital echo estimate words should consist of at least 12 bits. The memory size of less than 2 k bits is important for a small integrated circuit chip area and hence low cost of the echo canceller.

Each set of four digital estimates read at the same time from the memory partitions 41-44 are added by a serial arithmetic arrangement comprising three one-bit adders 61-63 to provide a 14 bit digital estimate of the full near end echo of the data transmitted over a 12 bit data interval, and each digital full echo estimate is applied via a digital-to-analogue converter 7 to an analogue summation circuit 8 together with the received signal to suppress the near end echo in the received signal. Each full echo estimate is applied to the analogue summation circuit 8 at an integral number of sample periods after the corresponding digital estimates are read from the memory partitions 41-44. The near end echo path for the transmitted data includes means which delay the near end echo so that each full echo estimate is applied to the analogue summation circuit 8 together with the near end echo which it is intended to suppress. An error signal circuit 9 derives from the output of the analogue summation circuit 8 an error signal which is applied to the memory unit 4 such that once per sample period an error adjusted digital estimate is written into each of the memory partitions 41-44, each adjusted digital estimate being written into its respective memory partition an integral number of sample periods after it was read therefrom. The use of the signal to the receiver RX as an error signal is due to the non-correlated transmitted and received signals and is a known feature of echo cancellers in transmitter/receiver units having appropriate scramblers and descramblers (not shown here).

An advantage of a memory compensation method of echo cancellation where actual full digital echo estimates are directly stored, in contrast to the transversal filter compensation method of echo cancellation where a synthesis is required of coefficients in respect of each bit of the data sequence, is that any non-linearity in the digital-to-analogue converter is automatically and fully compensated for by the normal operation of the error signal adjustment. The partitioned memory compensation method is a compromise in this respect in that non-linearity of the digital-to-analogue converter is only compensated within each partition. However, the greatest need for non-linearity compensation is in respect of the first partition which provides the largest component of the echo estimate being in respect of the most recently transmitted data bits. We consider that reduced compensation of non-linearity in the digital-to-analogue converter is acceptable if the first memory partition, which is addressed by the most recently transmitted data, is addressed by a sequence of at least three data bits. One possible alternative partitioned arrangement providing adequate echo cancellation for a line data rate of 160 kbit/s over a line length of 7-8 km would have four partitions with the first two being each addressed by 3 data bits and the second two each addressed by 2 data bits. For 4 samples per data bit period and 14 bit word estimates this would give a memory size of $2 \times 4 \times 14 \times (2^3 + 2^2) = 1344$ bits using a 10 bit data history. Another possible satisfactory partitioned arrangement would have three partitions with the first one being addressed by 4 data bits and the second and third each being addressed by 3 data bits. Again for 4 samples per data bit period and 14 bit word estimates this would give a memory size of $4 \times 14 \times (2^4 + (2 \times 2^3)) = 1792$ bits. This would be the same memory size as for the arrangement of FIG. 1 using a shorter data bit history but providing better compensation for non-linearity in the digital-to-analogue converter.

Referring back to FIG. 1, the digital-to-analogue converter 7 could be a serial converter such that the serial addition by the adders 61-63 and conversion by the converter 7 are completed in one sample period. Preferably, however, the digital estimates read from the memory partitions 41-44 at the same time are added by the adders 61-63 and put into a serial-to-parallel register for the converter 7 in one sample period, and in the succeeding sample period the digital full echo estimate is loaded from that register into a latch and the latched digital estimate is converted by the digital-to-analogue converter 7. Most conveniently the means which delay the near end echo comprise a digital delay D1 which delays the transmission of each data bit from the transmitter TX via the hybrid circuit 2 by an integral number of sample periods after that data bit is applied to the memory unit 4 for addressing the memory partitions 41–44. Thus where digital-to-analogue conversion by the converter 7 and settling of the analogue summation circuit 8 is completed two sample periods after the digital estimates are read from the memory partitions 41–44, then the digital delay D1 is a two sample period delay.

Four one-bit error adders 64–67 are provided in the memory unit 4, one in respect of each memory partition, and means D21–D24 are provided in the memory unit 4 to apply each digital estimate read from a memory partition to its respective error adder such that each error signal is applied to each of the error adders 64–67 together with the respective digital estimate which it is intended to adjust. It would be possible to read the digital estimates again from the partitions in order to present them at the correct time to the error adders 64–67, but this is avoided by the means D21–D24 consisting of an individual delay means for each partition into which the bits of the respective digital estimate are input in serial form at the same time as they are put into the serial arithmetic arrangement 61–63 and from which the bits of that digital estimate are output in serial form delayed by an integral number of sample periods.

Figure 2:
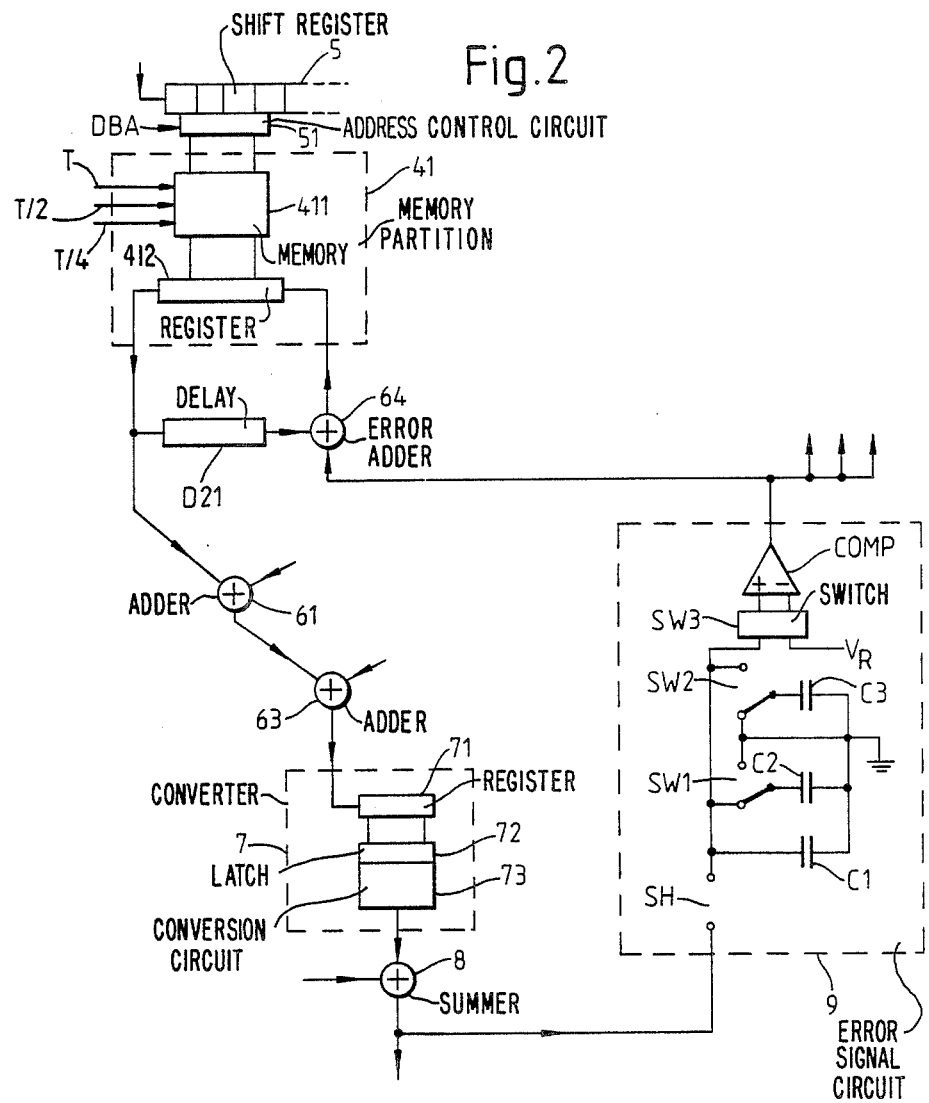
FIG. 2 shows part of the echo canceller of FIG. 1 in more detail.

Preferred means for providing the digital estimates read from the memory partitions in serial form to the serial arithmetic arrangement 61–63 and to the delay means D21–D24, and preferred means for writing the adjusted digital estimates derived from the error adders 64–67 into their correct locations in the memory partitions will be described later with reference to FIGS. 2 and 3. The error signal circuit 9 could comprise a comparator simply provided to give a positive or negative error signal which increments or decrements the digital estimates one step at a time. However a preferred form of error signal circuit 9, which will be described in detail later with reference to FIG. 2, is an analogue-to-digital converter which converts a sampled output of the analogue summation circuit 8 to a digital error signal over an integral number of sample periods. In this case, and where the digital estimates to be adjusted are applied in serial form from the delay means D21–D24 to the respective error adders 64–67, the digital error signal is also applied in serial form to each of the error adders 64–67.

It has already been mentioned that the small memory size of the partitions 41–44 is important for a small integrated circuit chip area. The chip area occupied by the arithmetic required for four memory partitions is small due to the requirement for only seven one-bit adders 61–67 and their operation via serial buses.

The operation of the echo canceller shown in FIG. 1 will now be described in more detail with additional reference to FIGS. 2 and 3. From the 160 kbit/s data signal received from the hybrid circuit 2 there is provided, by means not shown but well known, a clock signal of 10.24 MHz. From this clock signal are derived timing signals to control the echo canceller. FIG. 3 shows a signal T having a period of 6 $\mu$s which is the data bit period corresponding to the line data rate of 160 kbit/s, and signals T/2 and T/4 having periods respectively one half and one quarter of the period of signal T. Thus the period of signal T/4 is the sample period of 1.5 $\mu$s, and within each sample period there are sixteen clock signal periods. Line DB of FIG. 3 shows the current data bit (CDB) from the transmitter TX of FIG. 1 aligned with the signal T, preceded by the previous data bit PDB and followed by the next data bit NDB. Control signals ensure that the current data bit is entered into the first stage of the shift register 5, ENTER (CDB), and the contents of the shift register 5 are correspondingly changed at one eighth of a data bit period after the commencement of the current data bit period. Similarly the next data bit is entered into the first stage of the shift register 5, ENTER (NDB), at one eighth of a data bit period after its commencement. The signals T and T/2 provide a two bit sample phase code to determine the locations of four successive digital estimates to be read from each of the partitions 41–44 in each data bit period. The signal T/4 determines a reading phase R and a writing phase W within each sample period. The three data bits from the register 5 which are used to address each of the partitions 41–44 for reading and writing are controlled by a signal DBA applied to data bit address control circuits between the register 5 and the partitions 41–44. FIG. 2 shows such a data bit address control circuit 51 for the partition 41.

The first 14 bit digital estimate to be read from each of the partitions 41–44 after the current data bit is entered, ENTER (CDB), is read at a time R1C which is in the first clock signal period of the second sample period after the comencement of the current data bit period. The signal DBA at the time R1C has the phase CA, that is to say the current address determined by the first three data bits in the register 5 is provided via the control circuit 51 to the partition 41, the current address determined by data bits 4 to 6 is provided to the partition 42 and so on. At the time R1C these first digital estimates are read from the memory of each partition in parallel form into a parallel/serial register for that partition. FIG. 2 shows the memory 411 and the parallel/serial register 412 for the partition 41. In each of the succeeding fourteen clock signal periods, one bit of each first digital estimate is output from the parallel/serial register 412 and the corresponding parallel/serial registers of the other partitions 42–44, these four bits are added by the serial arithmetic arrangement consisting of the three one-bit adders 61–63 and their connecting serial buses, and the resultant single bit of the first full digital echo estimate is put into a serial/parallel register 71 provided in respect of the digital-to-analogue converter 7. Also in each of these fourteen clock signal periods, the bits which are output from the parallel/serial register 412 and the corresponding parallel/serial registers of the other partitions 42–44 are put into the respective delay means D21–D24 which each consist of a shift register capable of holding two digital estimates. These fourteen clock signal periods are shown as 1C (61–63) in FIG. 3.

The second 14 bit digital estimate to be read from each of the partitions 41–44 during the current data bit period is read at a time R2C which is in the first clock signal period of the third sample period after the commencement of the current data bit period, and in the succeeding fourteen clock signal periods these second digital estimates are passed out of the registers 412 etc, through the adders 61–63 into the register 71, and into the registers D21–D24. Also during this third sample period the first full digital echo estimate is transferred from the register 71 to a latch 72 provided in respect of the digital-to-analogue converter 7, converted to analogue form by a conversion circuit 73 and output to the analogue summation circuit 8. This third sample period is shown as 1C (7 AND 8) in FIG. 3.

The third 14 bit digital estimate to be read from each of the partitions 41-44 during the current data bit period is read at a time R3C which is in the first clock signal period of the fourth sample period after the commencement of the current data bit period, and in the succeeding fourteen clock signal periods these third digital estimates are passed out of the registers 412 etc. through the adders 61-63 into the register 71, and into the registers D21-D24. Also during this fourth sample period the second full digital estimate is transferred from the register 71 to the latch 72, converted by the circuit 73 and output to the analogue summation circuit 8. Also during this fourth sample period, shown as 1C (9 AND 64-67) in FIG. 3, a sampled output of the analogue summation circuit 8 is converted to a digital error signal by the error signal circuit 9. In the manner which will be described in detail later, the bits of the digital error signal are produced in serial form and are applied to each of the one-bit error adders 64-67 as they are produced without waiting for that error signal to be completed. The digital error signal produced by the circuit 9 in the fourth sample period is from the sampled output of the analogue summation circuit 8 produced from the settled analogue converted first full digital echo estimate. During the fourth sample period, the first digital estimates which have been put into the shift registers D21-D24, and which are intended to be adjusted by the error signal produced during this sample period, are output from those shift registers D21-D24 to the respective one-bit error adders 64-67. Thus during this fourth sample period an adjusted first digital estimate is produced in serial form from each of the error adders 64-67 and input in serial form to the respective parallel/serial registers 412 etc. at the same time as the third digital estimates are read out of the registers 412 etc. At the beginning of the final clock signal period of the fourth sample period of the current data bit period, the registers 412 etc. hold the completed adjusted first digital estimates and at a time W1C during this final clock signal period these adjusted first digital estimates are written from the registers 412 etc. into the memories 411 etc. of the memory partitions 41-44.

The fourth 14 bit digital estimates to be read from the partitions 41-44 still using the same data bits from the register 5, are read at a time R4C at the beginning of the next sample period and before the next data bit is put into the register 5 (ENTER NDB).

The correct memory partition addresses for writing back the adjusted first digital estimates at the time W1C are obtained as will now be explained. The sample phase address during the fourth sample period and during the reading phase R of the signal T/4 is that provided by the signals T and T/2 for reading the third digital estimates at the time R3C. In the succeeding writing phase W of the signal T/4, the sample phase address provided by the signals T and T/2 is changed by logic (not shown) to what it was at the time R1C, that is to say two sample periods before the time R3C. The signal DBA at the time W1C has the phase CA, that is to say the addresses determined by the register 5 via the control circuits 51 etc. are the same as at the time R1C.

At each of the times W4P, W3P and W2P, that is to say in the final clock signal periods of the third, second and first sample periods respectively after the commencement of the current data bit CDB, adjusted digital estimates are also written back into their correct locations in the memory partitions 41-44. In these cases the sample phase address for writing is again taken back by two stages before being advanced by one stage for the next reading operation. However, the signal DBA in each of these three cases has the phase PA, that is to say that in order to take back the full address for writing by two stages the addresses determined by the register 5 via the control circuits 51 etc. have to be taken back by one stage. Thus in each of these three cases, the previous address provided by the second, third and fourth bits in the register 5 is provided via the control circuit 51 to the partition 41, the previous address determined by data bits 5 to 7 is provided to the partition 42 and so on.

Figure 3:
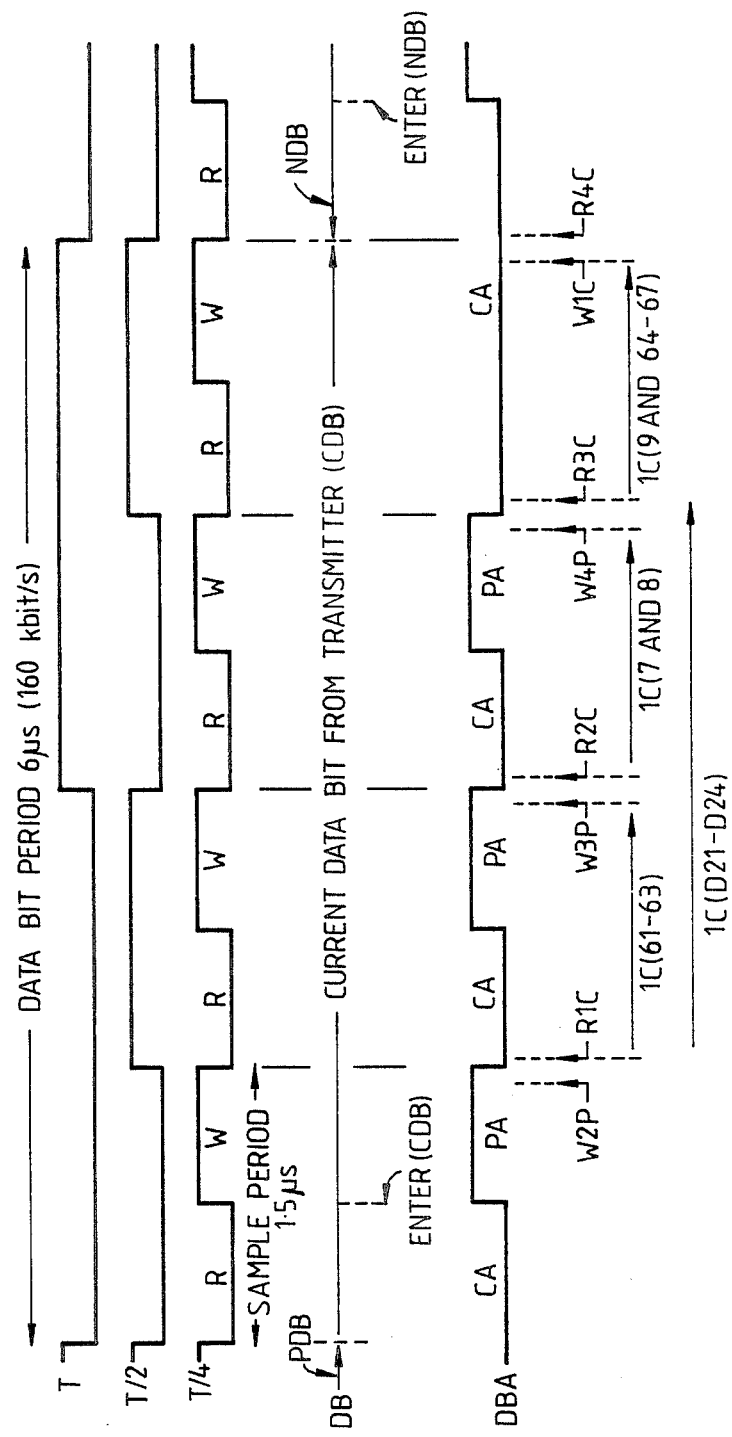
FIG. 3 shows timing diagrams of the echo canceller of FIGS. 1 and 2.

A possible alternative to the particular arrangement and operation of the partitions 41-44 as just described with reference to FIGS. 2 and 3, is to have the memory of each partition as a block of shift registers, for example 32 registers in each partition for the same memory size as described above. This would have the advantage of independent reading and writing, that is to say one digital estimate could be serially read out of one register while an adjusted digital estimate is serially written back into another register.

The analogue-to-digital converter error signal circuit 9 will now be described in detail. As has been already mentioned, a sampled output of the analogue summation circuit 8 is each time converted to a digital error signal within one sample period, the bits of the digital error signal being produced in serial form and applied to each of the one-bit error adders 64-67 as they are produced without waiting for that error signal to be completed. The error signal circuit 9 essentially comprises means SH for sampling the output of the analogue summation circuit 8 once per sample period, an arrangement of three equal capacitors C1, C2, C3, a switching arrangement SW1, SW2, SW3 and a single comparator COMP with a reference voltage $V_R$. The digital error signal is exponentially quantised corresponding to its input signal expressed as a multiple of the reference voltage $V_R$, truncated to the nearest power of 2.

The input voltage sampled by the means SH is first applied at the sampling instant as a differential input to the comparator COMP to determine the sign of the input voltage and to provide an output bit of the converter indicative of that sign. The input signal is also applied to charge the capacitor C1. Depending on the determined sign of the sampled input voltage, the reference voltage $V_R$ and the initial voltage on the capacitor C1 are applied to appropriate inputs of the comparator COMP via the switching circuit SW3. At the end of the first clock cycle after the sign bit determination, the voltage on the capacitor C1 is compared with the reference voltage $V_R$ to provide a least significant bit output of the converter. In the next clock cycle the charge on the capacitor C1 is shared with the equal capacitor C2 and the halved input voltage is compared again with $V_R$ to provide the next significant bit output of the converter. In the next clock cycle, via the switches SW1 and SW2, the capacitor C2 is discharged to ground and the capacitor C3 is connected in parallel with the capacitor C1 to again halve the sampled input voltage which is again compared with the reference voltage $V_R$. In the following clock cycle the capacitor C3 is grounded and the capacitor C2 is reconnected in parallel with capacitor C1, and so on. The reference voltage $V_R$ is set to a value which is approximately half the peak signal voltage for the longest line. The least significant bit output of the converter will correspond to the magnitude of the input voltage on capacitor C1 being greater than $V_R$. On successive clock cycles as the input voltage is halved, the output bit provided by the comparator COMP will remain the same until the input voltage becomes less than $V_R$ when the output bit changes.

The particular arrangement of capacitors C1, C2 and C3, the switching arrangement SW1, SW2, SW3 and the reference voltage $V_R$ shown in FIG. 2 may be varied in practical implementation. For example it may be convenient to have two sets of three capacitors, with the input voltage being switched to one of them according to its determined sign. A single reference voltage may be used with the capacitor arrangement, or equal but opposite sign reference voltages may be applied to the comparator according to the determined sign of the input voltage. Instead of three equal capacitors, the capacitor arrangement may consist of two capacitors, one having one third of the capacitance of the other, with a suitable switching arrangement such that both capacitors are initially charged and then each time the smaller capacitor is discharged and reconnected to halve the initial voltage. In all cases a single comparator is used and the output is produced in serial form in one sample period with effectively zero conversion time.

The first output sign bit of the error signal circuit 9 is combined with the succeeding output bits in the one-bit error adders 64–67 to provide the result of analogue-to-digital conversion in two's complement coded form, least significant bit first. The serial data format of the digital estimates from the partitions 41-44 which are applied to the error adders 64–67 via the delay shift registers D21–D24 respectively is also two's complement, least significant bit first. As has been stated above, the digital error signal is exponentially quantised to the nearest power of 2, that is to say it corresponds to results of $\pm 1$, $\pm 2$, $\pm 4$, $+8$ etc. If required for a different arrangement of an echo canceller, the least significant and succeeding bit outputs of the converter can be produced from the comparator for positive and negative error signals and combined with the sign bit output in such a way as to provide the result of analogue-to-digital conversion in other known bipolar codes, each time exponentially quantised.

I claim:

1. An echo canceller for enabling full duplex digital data communication in a transmitter/receiver unit when connected via a hybrid circuit to one end of a two-wire line, in which a memory unit has memory partitions, each of which is addressed by a sequence of data bits transmitted over part of a predetermined data interval, in which once per sample period there is directly read from each memory partition a digital estimate of the near end echo in the received signal of the data transmitted over a corresponding part of said data interval, in which in the memory unit digital estimates which are read from the partitions at the same time are added to provide a digital estimate of the full said near end echo of the data transmitted over said data interval, in which each said digital full echo estimate is applied via a digital-to-analog converter to an analog summation circuit together with the received signal to suppress the full said near end echo in the received signal, and in which an error signal circuit derives from the output of the analog summation circuit an error signal which is applied to the memory unit such that once per sample period an error adjusted digital estimate is written into each memory partition, characterized in that there are at least three memory partitions, the one which is addressed by the most recently transmitted data being addressed by a sequence of at least three data bits and said data interval being at least nine data bit periods, in that the addition of digital estimates from the memory is by serially passing data, one bit at a time, on serial buses between elements of an arithmetic arrangement, each full echo estimate being applied to the analog summation circuit at a non-zero integral number of sample periods after the digital estimates which are added to provide that full echo estimate have been read from the memory partitions, in that the near end echo path for the transmitted data includes means which delay the near end echo so that each full echo estimate is applied to the analog summation circuit together with the near end echo which it is intended to suppress, and in that means are provided in the memory unit to apply each digital estimate read from a memory partition to a respective error adder provided for each partition at the same time as the error signal appropriate to adjust that digital estimate, each adjusted digital estimate output from a said error adder being written into the memory partition for which that error adder is provided a non-zero integral number of sample periods after the corresponding digital estimate was read therefrom prior to adjustment.

2. An echo canceller as claimed in claim 1, in which there are four memory partitions.

3. An echo canceller as claimed in claim 2, in which said serial arithmetic arrangement for adding the digital estimates from the memory partitions comprises three one-bit adders.

4. An echo canceller as claimed in claim 2, in which each memory partition is addressed by a sequence of three data bits.

5. An echo canceller as claimed in claim 1, in which there are four sample periods per data bit period and correspondingly four different digital estimates are read from each memory partition per data bit period.

6. An echo canceller as claimed in claim 1, in which each digital estimate is a word consisting of at least twelve bits.

7. An echo canceller as claimed in claim 1, in which said means which delay the near end echo comprise means which delay the transmission of each data bit via the hybrid circuit by a non-zero integral number of sample periods after that data bit is applied to the memory unit for addressing the memory partitions.

8. An echo canceller as claimed in claim 1, in which said digital estimates read from the memory partitions at the same time are added by said serial arithmetic arrangement in one sample period, and in which the resulting digital full echo estimate is converted by said digital-to-analog converter in the succeeding sample period.

9. An echo canceller as claimed in claim 1, in which the error signal circuit is an analog-to-digital converter which converts a sampled output of the analog summation circuit to a digital error signal over a non-zero integral number of sample periods.

10. An echo canceller as claimed in claim 1, in which there are four memory partitions, in which there are four sample periods per data bit period and correspondingly four different digital estimates are read from each memory partition per data bit period.

11. An echo canceller as claimed in claim 1, in which there are four memory partitions, in which each memory partition is addressed by a sequence of three data bits, in which there are four sample periods per data bit period and correspondingly four different digital estimates are read from each memory partition per data bit period.

12. An echo canceller for enabling full duplex digital data communication in a transmitter/receiver unit when connected via a hybrid circuit to one end of a two-wire line, in which a compensation unit is successively addressed by sequences of data bits transmitted over a predetermined data interval, in which the compensation unit contains information from which in each of a number of sample periods per data bit period there is provided a digital estimate of the near end echo of the data transmitted over said data interval, in which each said digital estimate is applied via a digital-to-analog converter to an analog summation circuit together with the received signal to suppress said near end echo in the received signal, and in which an error signal circuit derives from the output of the analog summation circuit an error signal which is applied to the compensation unit such that once per sample period the information in the compensation unit is adjusted, characterized in that the error signal circuit is an analog-to-digital converter which converts a sampled output of the analog summation circuit to an exponentially quantized digital error signal, and in that in the analog-to-digital converter the sampled output of the analog summation circuit is applied as an input voltage to charge a capacitor arrangement to an initial voltage which is compared with a reference voltage to provide a least significant bit output of the converter, after which in each of successive steps the voltage on the capacitor arrangement is halved and that halved voltage is compared with said reference voltage to provide a respective next significant bit output of the converter.

13. An echo canceller as claimed in claim 12, in which the compensation unit is a memory unit which contains a set of digital estimates of said near end echo, each digital estimate of the set corresponding to one of said number of sample periods and one of the possible said sequences of data bits, and in which the error signal is applied to the memory unit such that once per sample period an error adjusted digital estimate is written into the memory unit.

14. An echo canceller as claimed in claim 12, in which the compensation unit is a memory unit having memory partitions each of which is addressed by a sequence of data bits transmitted over part of said data interval, in which once per sample period there is directly read from each memory partition a digital estimate of the near end echo of the data transmitted over a corresponding part of said data interval, in which in the memory unit digital estimates which are read at the same time are added to provide said digital estimate of the near end echo of the data transmitted over said data interval, and in which the error signal is applied to the memory unit such that once per sample period an error adjusted digital estimate is written into each memory partition.

15. An echo canceller as claimed in claim 12, in which the analog-to-digital converter includes a single comparator and a switching arrangement by means of which said input voltage is first applied to the comparator to determine the sign of that input voltage and to provide an output bit of the converter indicative of that sign, said reference voltage and said initial voltage on the capacitor arrangement then being applied in dependence on said determined sign of the input voltage to appropriate inputs of the comparator to provide said least significant and each said respective next significant output bit of the converter, and in which said sign bit and said least significant and each said respective next significant bit are combined to provide the result of analog-to-digital conversion in a predetermined bipolar code.

16. An echo canceller as claimed in claim 12, in which the compensation unit is a memory unit which contains a set of digital estimates of said near end echo, each digital estimate of the set corresponding to one of said number of sample periods and one of the possible said sequences of data bits, and in which the error signal is applied to the memory unit such that once per sample period an error adjusted digital estimate is written into the memory unit, in which the analog-to-digital converter includes a single comparator and a switching arrangement by means of which said input voltage is first applied to the comparator to determine the sign of that input voltage and to provide an output bit of the converter indicative of that sign, said reference voltage and said initial voltage on the capacitor arrangement then being applied in dependence on said determined sign of the input voltage to appropriate inputs of the comparator to provide said least significant and each said respective next significant output bit of the converter, and in which said sign bit and said least significant and each said respective next significant bit are combined to provide the result of analog-to-digital conversion in a predetermined bipolar code.

17. An echo canceller as claimed in claim 12, in which the compensation unit is a memory unit having memory partitions, each of which is addressed by a sequence of data bits transmitted over part of said data interval, in which once per sample period there is directly read from each memory partition a digital estimate of the near end echo of the data transmitted over a corresponding part of said data interval, in which in the memory unit digital estimates which are read from the partitions at the same time are added to provide said digital estimate of the near end echo of the data transmitted over said data interval, and in which the error signal is applied to the memory unit such that once per sample period an error adjusted digital estimate is written into each memory partition, in which the analog-to-digital converter includes a single comparator and a switching arrangement by means of which said input voltage is first applied to the comparator to determine the sign of that input voltage and to provide an output bit of the converter indicative of that sign, said reference voltage and said initial voltage on the capacitor arrangement then being applied in dependence on said determined sign of the input voltage to appropriate inputs of the comparator to provide said least significant and each said respective next significant output bit of the converter, and in which said sign bit and said least significant and each said respective next significant bit are combined to provide the result of analog-to-digital conversion in a predetermined bipolar code.

18. An echo canceller for enabling full duplex digital data communication in a transmitter/receiver unit when connected via a hybrid circuit to one end of a two-wire line, in which a memory unit has memory partitions, each of which is addressed by a sequence of data bits transmitted over part of a predetermined data interval, in which once per sample period there is directly read from each memory partition a digital estimate of the near end echo in the received signal of the data transmitted over a corresponding part of said data interval, in which in the memory unit digital estimates which are read from the partitions at the same time are added to provide a digital estimate of the full said near end echo of the data transmitted over said data interval, in which each said digital full echo estimate is applied via a digital-to-analog converter to an analog summation circuit together with the received signal to suppress the full said near end echo in the received signal, and in which an error signal circuit derives from the output of the analog summation circuit an error signal which is applied to the memory unit such that once per sample period an error adjusted digital estimate is written into each memory partition, characterized in that there are at least three memory partitions, the one which is addressed by the most recently transmitted data being addressed by a sequence of at least three data bits and said data interval being at least nine data bits periods, in that the addition of digital estimates from the memory partitions is by a serial arithmetic arrangement, each full echo estimate being applied to the analog summation circuit at a non-zero integral number of sample periods after the digital estimates which are added to provide that full echo estimate have been read from the memory partitions, in that the near end echo path for the transmitted data includes means which delay the near end echo so that each full echo estimate is applied to the analog summation circuit together with the near end echo which it is intended to suppress, in that means are provided in the memory unit to apply each digital estimate read from a memory partition to a respective error adder provided for each partition at the same time as the error signal appropriate to adjust that digital estimate, each adjusted digital estimate output from a said error adder being written into the memory partition for which that error adder is provided a non-zero integral number of sample periods after the corresponding digital estimate was read therefrom prior to adjustment, and in which said means provided to apply each digital estimate to an error adder consists of delay means into which the bits of that digital estimate are input in serial form at the same time as they are put into said serial arithmetic arrangement and from which the bits of that digital estimate are output in serial form delayed by a non-zero integral number of sample periods.

19. An echo canceller for enabling full duplex digital data communication in a transmitter/receiver unit when connected via a hybrid circuit to one end of a two-wire line, in which a memory unit has memory partitions, each of which is addressed by a sequence of data bits transmitted over part of a predetermined data interval, in which once per sample period there is directly read from each memory partition a digital estimate of the near end echo in the received signal of the data transmitted over a corresponding part of said data interval, in which in the memory unit digital estimates which are read from the partitions at the same time are added to provide a digital estimate of the full said near end echo of the data transmitted over said data interval, in which each said digital full echo estimate is applied via a digital-to-analog converter to an analog summation circuit together with the received signal to suppress the full said near end echo in the received signal, and in which an error signal circuit derives from the output of the analog summation circuit an error signal which is applied to the memory unit such that once per sample period an error adjusted digital estimate is written into each memory partition, characterized in that there are at least three memory partitions, the one which is addressed by the most recently transmitted data being addressed by a sequence of at least three data bits and said data interval being at least nine data bit periods, in that the addition of digital estimates from the memory partitions is by a serial arithmetic arrangement, each full echo estimate being applied to the analog summation circuit at a non-zero integral number of sample periods after the digital estimates which area added to provide that full echo estimate have been read from the memory partitions, in that the near end echo path for the transmitted data includes means which delay the near end echo so that each full echo estimate is applied to the analog summation circuit together with the near end echo which it is intended to suppress, in that means are provided in the memory unit to apply each digital estimate read from a memory partition to a respective error adder provided for each partition at the same time as the error signal appropriate to adjust that digital estimate, each adjusted digital estimate output from a said error adder being written into the memory partition for which that error adder is provided a non-zero integral number of sample periods after the corresponding digital estimate was read therefrom prior to adjustment, and in which a respective serial/parallel register is provided for each memory partition, a digital estimate which has been read from each memory partition in parallel form being output from the respective register in serial form to the serial arithmetic arrangement while an adjusted digital estimate which is to be written into that memory partition in parallel form is being input to that register in serial form from the respective error adder.

20. An echo canceller for enabling full duplex digital data communication in a transmitter/receiver unit when connected via a hybrid circuit to one end of a two-wire line, in which a memory unit has memory partitions, each of which is addressed by a sequence of data bits transmitted over part of a predetermined data interval, in which once per sample period there is directly read from each memory partition a digital estimate of the near end echo in the received signal of the data transmitted over a corresponding part of said data interval, in which in the memory unit digital estimates which are read from the partitions at the same time are added to provide a digital estimate of the full said near end echo of the data transmitted over said data interval, in which each said digital full echo estimate is applied via a digital-to-analog converter to an analog summation circuit together with the received signal to suppress the full said near end echo in the received signal, and in which an error signal circuit derives from the output of the analog summation circuit an error signal which is applied to the memory unit such that once per sample period an error adjusted digital estimate is written into each memory partition, characterized in that there are at least three memory partitions, the one which is addressed by the most recently transmitted data being addressed by a sequence of at least three data bits and said data interval being at least nine data bit periods, in that the addition of digital estimates from the memory partitions is by a serial arithmetic arrangement, each full echo estimate being applied to the analog summation circuit at a non-zero integral number of sample periods after the digital estimates which are added to provide that full echo estimate have been read from the memory partitions, in that the near end echo path for the transmitted data includes means which delay the near end echo so that each full echo estimate is applied to the analog summation circuit together with the near end echo which it is intended to suppress, in that means are provided in the memory unit to apply each digital estimate read from a memory partition to a respective error adder provided for each partition at the same time as the error signal appropriate to adjust that digital estimate, each adjusted digital estimate output from a said error adder being written into the memory partition for which that error adder is provided a non-zero integral number of sample periods after the corresponding digital estimate was read therefrom prior to adjustment, in which the error signal circuit is an analog-to-digital converter which converts a sampled output of the analog summation circuit to a digital error signal over a non-zero integral number of sample periods, and in which both each digital estimate and the digital error signal appropriate to adjust that digital estimate are applied in serial form to the respective error adders.

21. An echo canceller for enabling full duplex digital data communication in a transmitter/receiver unit when connected via a hybrid circuit to one end of a two-wire line, in which a memory unit has memory partitions, each of which is addressed by a sequence of data bits transmitted over part of a predetermined data interval, in which once per sample period there is directly read from each memory partition a digital estimate of the near end echo in the received signal of the data transmitted over a corresponding part of said data interval, in which in the memory unit digital estimates which are read from the partitions at the same time are added to provide a digital estimate of the full said near end echo of the data transmitted over said data interval, in which each said digital full echo estimate is applied via a digital-to-analog converter to an analog summation circuit together with the received signal to suppress the full said near end echo in the received signal, and in which an error signal circuit derives from the output of the analog summation circuit an error signal which is applied to the memory unit such that once per sample period an error adjusted digital estimate is written into each memory partition, characterized in that there are at least three memory partitions, the one which is addressed by the most recently transmitted data being addressed by a sequence of at least three data bits and said data interval being at least nine data bit periods, in that the addition of digital estimates from the memory partitions is by a serial arithmetic arrangement, each full echo estimate being applied to the analog summation circuit at a non-zero integral number of sample periods after the digital estimates which are added to provide that full echo estimate have been read from the memory partitions, in that the near end echo path for the transmitted data includes means which delay the near end echo so that each full echo estimate is applied to the analog summation circuit together with the near end echo which it is intended to suppress, and in that means are provided in the memory unit to apply each digital estimate read from a memory partition to a respective error adder provided for each partition at the same time as the error signal appropriate to adjust that digital estimate, each adjusted digital estimate output from a said error adder being written into the memory partition for which that error adder is provided a non-zero integral number of sample periods after the corresponding digital estimate was read therefrom prior to adjustment, in which the error signal circuit is an analog-to-digital converter which converts a sampled output of the analog summation circuit to a digital error signal over a non-zero integral number of sample periods, in which the digital error signal is exponentially quantized, and in which in the analog-to-digital converter the sampled output of the analog summation circuit is applied as an input voltage to charge a capacitor arrangement to an initial voltage which is compared with a reference voltage to provide a least significant bit output of the converter, after which in each of successive steps the voltage on the capacitor arrangement is halved and that halved voltage is compared with said reference voltage to provide a respective next significant bit output of the converter.

22. An echo canceller as claimed in claim 21, in which each digital estimate read from a memory partition is applied to the respective error adder in serial form, and in which the digital error signal is produced in one sample period, the bits of each digital error signal being applied to the error adders as they are produced in serial form waiting for the analog-to-digital conversion of the respective said sampled output of the analog summation circuit to be completed.

23. An echo canceller as claimed in claim 21, in which the analog-to-digital converter includes a single comparator and a switching arrangement by means of which said input voltage is first applied to the comparator to determine the sign of that input voltage and to provide an output bit of the converter indicative of that sign, said reference voltage and said initial voltage on the capacitor arrangement then being applied in dependence on said determined sign of the input voltage to appropriate inputs of the comparator to provide said least significant and each said respective next significant output bit of the converter, and in which said sign bit and said least significant and each said respective next significant bit are combined to provide the result of analog-to-digital conversion in a predetermined bipolar code.

24. An echo canceller for enabling full duplex digital data communication in a transmitter/receiver unit when connected via a hybrid circuit to one end of a two-wire line, in which a memory unit has memory partitions, each of which is addressed by a sequence of data bits transmitted over part of a predetermined data interval, in which once per sample period there is directly read from each memory partition a digital estimate of the near end echo in the received signal of the data transmitted over a corresponding part of said data interval, in which in the memory unit digital estimates which are read from the partitions at the same time are added to provide a digital estimate of the full said near end echo of the data transmitted over said data interval, in which each said digital full echo estimate is applied via a digital-to-analog converter to an analog summation circuit together with the received signal to suppress the full said near end echo in the received signal, and in which an error signal circuit derives from the output of the analog summation circuit an error signal which is applied to the memory unit such that once per sample period an error adjusted digital estimate is written into each memory partition, characterized in that there are at least three memory partitions, the one which is addressed by the most recently transmitted data being addressed by a sequence of at least three data bits and said data interval being at least nine data bit periods, in that the addition of digital estimates from the memory partitions is by a serial arithmetic arrangement, each full echo estimate being applied to the analog summation circuit at a non-zero integral number of sample periods after the digital estimates which are added to provide that full echo estimate have been read from the memory partitions, in that the near end echo path for the transmitted data includes means which delay the near end echo so that each full echo estimate is applied to the analog summation circuit together with the near end echo which it is intended to suppress, in that means are provided in the memory unit to apply each digital estimate read from a memory partition to a respective error adder provided for each partition at the same time as the error signal appropriate to adjust that digital estimate, each adjusted digital estimate output from a said error adder being written into the memory partition for which that error adder is provided a non-zero integral number of sample periods after the corresponding digital estimate was read therefrom prior to adjustment, in which the error signal circuit is an analog-to-digital converter which converts a sampled output of the analog summation circuit to a digital error signal over a non-zero integral number of sample periods, in which the digital error signal is exponentially quantized, in which in the analog-to-digital converter the sampled output of the analog summation circuit is applied as an input voltage to charge a capacitor arrangement to an initial voltage which is compared with a reference voltage to provide a least significant bit output of the converter, after which in each of successive steps the voltage on the capacitor arrangement is halved and that halved voltage is compared with said reference voltage to provide a respective next significant bit output of the converter, in which the analog-to-digital converter includes a single comparator and a switching arrangement by means of which said input voltage is first applied to the comparator to determine the sign of that input voltage and to provide an output bit of the converter indicative of that sign, said reference voltage and said initial voltage on the capacitor arrangement then being applied in dependence on said determined sign of the input voltage to appropriate inputs of the comparator to provide said least significant and each said respective next significant output bit of the converter, and in which said sign bit and said least significant and each said respective next significant bits are combined to provide the result of analog-to-digital conversion in a predetermined bipolar code, and in which each error adder is a one-bit adder, in which the digital estimates are applied to the one-bit error adders in two's complement coded serial form, and in which the combination of the error signal least significant bit and next significant bits with the error signal sign bit is performed by the one-bit adders to provide the result of analog-to-digital conversion in two's complement coded form.

* * * * *

UNITED STATES PATENT AND TRADEMARK OFFICE
CERTIFICATE OF CORRECTION

PATENT NO. : 4,972,406

DATED : November 20, 1990

INVENTOR(S) : Ian J. Dedic

It is certified that error appears in the above-identified patent and that said Letters Patent is hereby corrected as shown below:

On the title page:

Under the heading "Assignee" cancel, "THE GENERAL ELECTRIC COMPANY, p.l.c." and substitute therefor:

--GEC Plessey Telecommunications Limited, United Kingdom--.

Signed and Sealed this

Ninth Day of March, 1993

Attest:

STEPHEN G. KUNIN

*Attesting Officer*   *Acting Commissioner of Patents and Trademarks*